(12) United States Patent
Happe

(10) Patent No.: US 10,494,191 B2
(45) Date of Patent: Dec. 3, 2019

(54) SMART DRAPER BELT

(71) Applicant: ContiTech Transportbandsysteme GmbH, Hannover (DE)

(72) Inventor: Jeff Happe, Ankeny, IA (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 16/097,843

(22) PCT Filed: Apr. 20, 2017

(86) PCT No.: PCT/EP2017/059373
§ 371 (c)(1),
(2) Date: Oct. 31, 2018

(87) PCT Pub. No.: WO2017/190961
PCT Pub. Date: Nov. 9, 2017

(65) Prior Publication Data
US 2019/0144209 A1    May 16, 2019

Related U.S. Application Data

(60) Provisional application No. 62/331,087, filed on May 3, 2016.

(51) Int. Cl.
*B65G 43/02* (2006.01)
*A01D 57/20* (2006.01)
*B65G 43/06* (2006.01)
*A01D 61/02* (2006.01)

(52) U.S. Cl.
CPC ............. *B65G 43/02* (2013.01); *A01D 57/20* (2013.01); *B65G 43/06* (2013.01); *A01D 61/02* (2013.01)

(58) Field of Classification Search
CPC ................................ B65G 43/02; A01D 57/20
See application file for complete search history.

(56) References Cited

U.S. PATENT DOCUMENTS 7,543,428 B1    6/2009  Puryk et al.
8,484,939 B1 *  7/2013  Cormier ................. A01D 43/06
                                                   56/158
9,776,799 B2 * 10/2017  Ulchak ................... B65G 17/08
10,191,001 B2 *  1/2019  Kleczewski ........... B65G 17/08
(Continued)

OTHER PUBLICATIONS

International Search Report dated Jun. 23, 2017 of International application PCT/EP2017/059373 on which this application is based.

*Primary Examiner* — Gene O Crawford
*Assistant Examiner* — Lester Ill Rushin
(74) *Attorney, Agent, or Firm* — David L. Cate; Gregory Adams

(57) ABSTRACT

A draper belt includes a carcass (7), a plurality of cleats (1) extending from the carcass (7), a plurality of v-guides (4) disposed perpendicular to the plurality of cleats, and at least one sensor for measuring and relaying information regarding key measurable properties about the draper belt. The key measurable properties may be relayed to an operator, a control system, or combination thereof. In some cases, the sensors measure and relay potentially damaging condition(s) of the draper belt. In some aspects, the sensors measure and relay in real time so one or more properties of the draper belt is ascertainable in situ.

6 Claims, 3 Drawing Sheets

(56) References Cited

U.S. PATENT DOCUMENTS

2008/0006513 A1   1/2008  Stolyar et al.
2008/0257692 A1  10/2008  Wallace
2011/0024269 A1   2/2011  Wallace
2013/0097986 A1* 4/2013   Lovett .................... A01D 41/14
                                                 56/153

* cited by examiner

** Embedded objects are conductive elements, magnetic elements, or potentially both. These could be metallic, but do not need to be.

SMART DRAPER BELT

FIELD

The field to which the disclosure generally relates to is agricultural implements for harvesting crops, and more particularly to draper belts used in harvesting headers comprising a draper deck.

BACKGROUND

This section provides background information to facilitate a better understanding of the various aspects of the disclosure. It should be understood that the statements in this section of this document are to be read in this light, and not as admissions of prior art.

It is known in the field of crop harvesting equipment to employ draper headers to cut crops for various purposes, such as feeding a combine harvester or swathing crop material. Such draper headers may comprise a cutter bar assembly for cutting the crop material, and a draper deck assembly for transporting the cut crop material to a desired location (e.g. the intake for a combine harvester). The draper deck assembly normally comprises two spaced-apart rollers for receiving a continuous loop of a draper belt, with a support plate fixed under the upper run of the draper belt and disposed between the rollers. In operation, the implement is driven into the standing crop, with the cutting edge assembly at the leading edge of the implement. After the cutting edge assembly cuts the crop material, the crop material falls and/or is moved rearwardly onto the generally horizontal draper deck assembly and then transported perpendicular to the direction of travel by the draper deck assembly and deposited either on the ground or at an intake for subsequent processing. Such an arrangement has many known benefits and has achieved wide acceptance and use.

It has been recognized that traditional cutter/draper arrangements as described above may encounter problems, which include maintaining continuous movement of the draper belt to avoid damaging the belt of other equipment. In some cases, draper header manufacturers install equipment to measure the speed of the driver and driven rollers. This approached is used to attempt to identify whether the draper belt has stalled or otherwise slowed, so the crop harvesting equipment may be stopped to avoid burning or otherwise damaging the draper belt. However, only monitoring the speeds of the rollers can be limited in practice, since in some cases, the draper belt may not be moving simultaneously with the rollers, or the draper belt may be mistracked on the rollers. In either case, over a long period, the draper belt may become damaged and require replacement. Such situations may lead to high warranty or unnecessary maintenance costs.

Thus, there is a need for improved systems for monitoring and identifying conditions of draper belt movement on a draper deck assembly and to better avoid draper belt mistracking and damage, such need met at least in part with embodiments according to this disclosure.

SUMMARY

This section provides a general summary of the disclosure, and is not a necessarily a comprehensive disclosure of its full scope or all of its features.

In a first aspect of the disclosure, a draper belt includes a carcass, a plurality of cleats extending from the carcass, a plurality of v-guides disposed perpendicular to the a plurality of cleats, and at least one sensor for measuring and relaying information regarding key measurable properties about the draper belt. The key measurable properties may be relayed to an operator, a control system, or combination thereof. In some cases, the sensors measure and relay potentially damaging condition(s) of the draper belt. In some aspects, the sensors measure and relay in real time so one or more properties of the draper belt is ascertainable in situ.

Another aspect of the disclosure is a crop harvesting header operable to harvest crop which includes a header frame, a cutterbar assembly mounted to the header frame to extend lengthwise in a lateral direction relative to the normal direction of travel of the header, and a draper assembly including an endless flexible draper belt configured to receive severed crop materials from the cutterbar assembly and convey the materials laterally. The draper belt includes at least one sensor to measure and relay information regarding key measurable properties about the draper belt to at least one of an operator and a control system.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
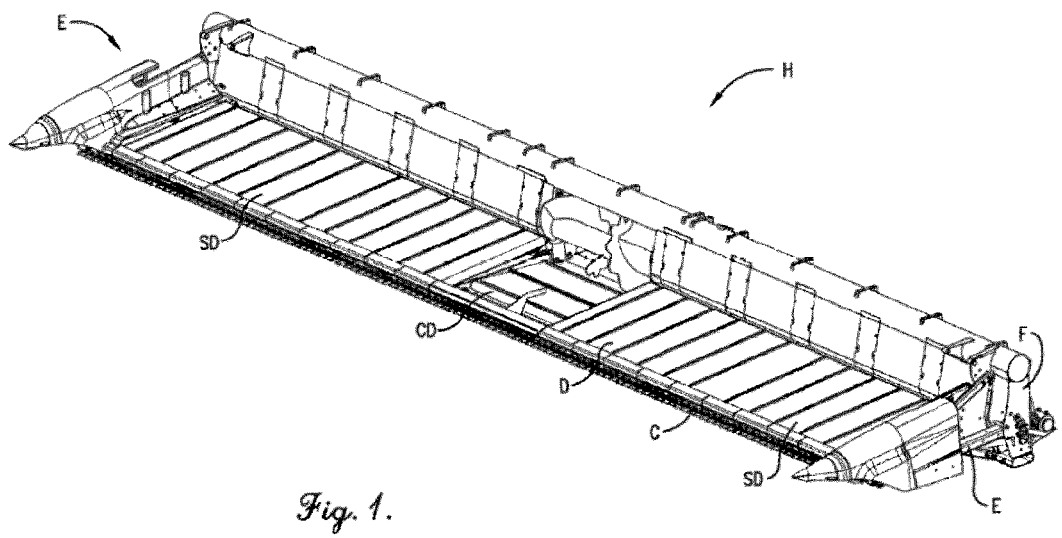
FIG. 1 is a front perspective of a crop harvesting header.
Figure 2:
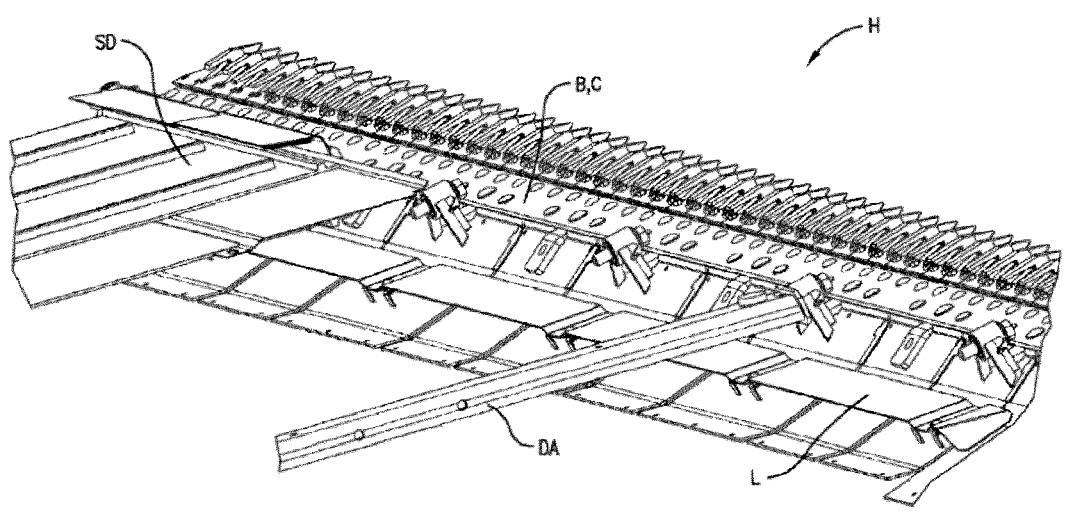
FIG. 2 is a fragmentary rear perspective of the crop harvesting header shown in FIG. 1, showing a cutterbar assembly and side draper.
Figure 3:
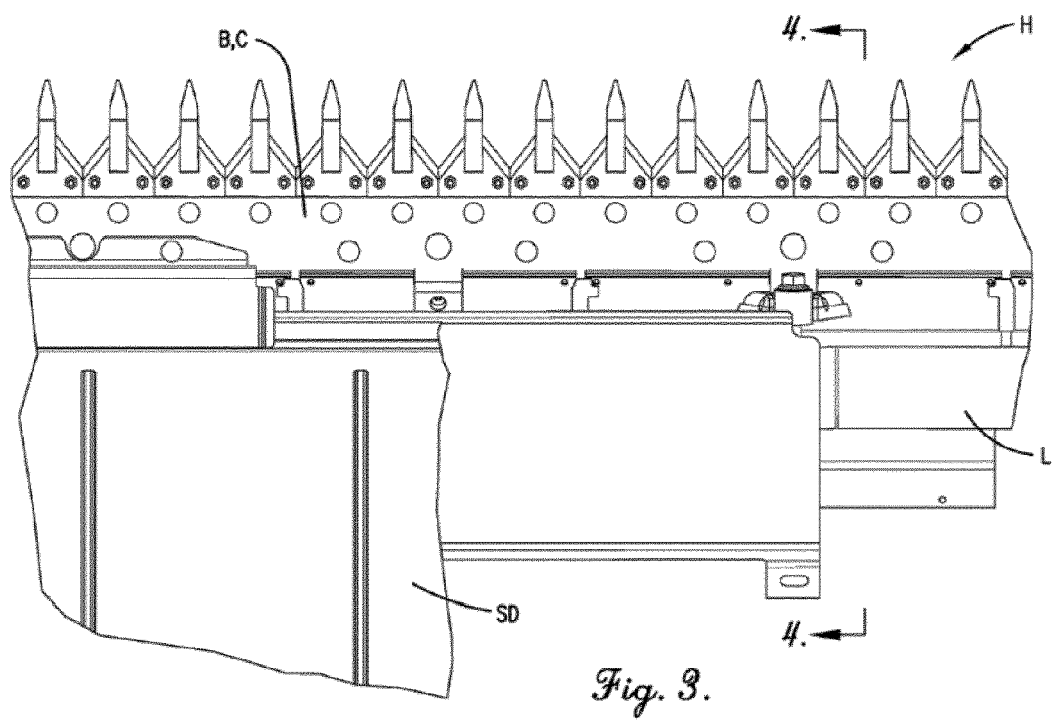
FIG. 3 is a fragmentary top view of the crop harvesting header shown in FIGS. 1 and 2.
Figure 4:
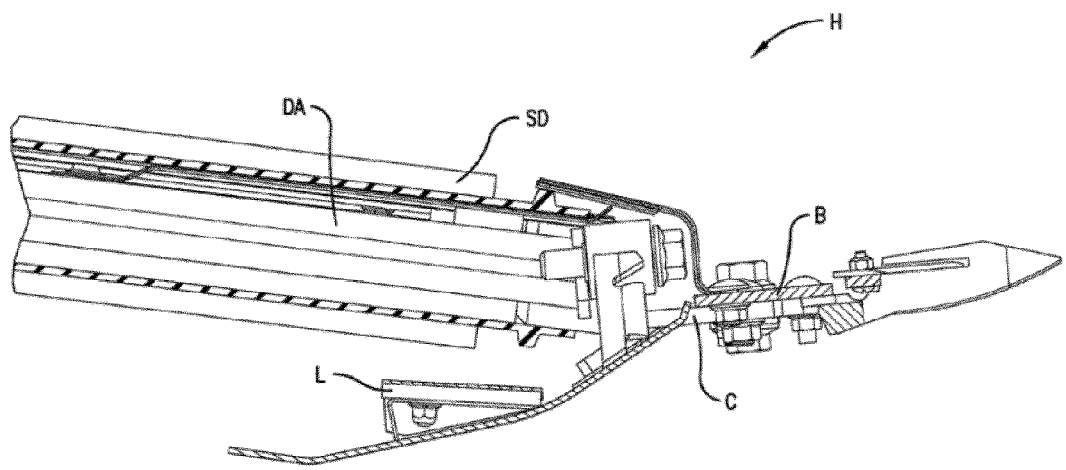
FIG. 4 is a fragmentary side elevation of the crop harvesting header shown in FIGS. 1-3, with the header being cross-sectioned to show the side draper and cutterbar assembly.
Figure 5:
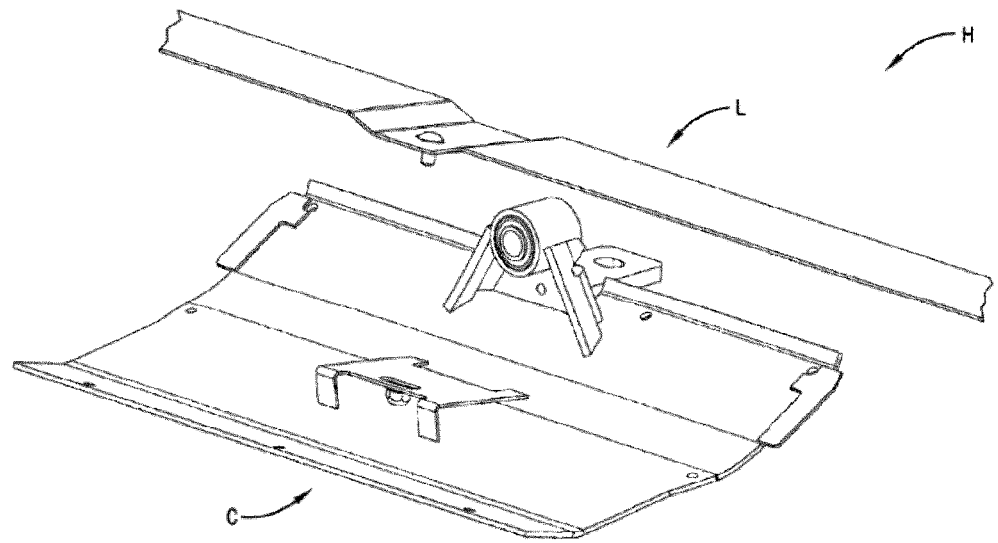
FIG. 5 is a fragmentary rear perspective of the crop harvesting header shown in FIGS. 1-4, showing a skid of the cutterbar assembly and a belt support panel; and, FIG. 6 depicts a portion of draper belt embodiment in a perspective sectional view, in accordance with the disclosure.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

In accordance with some aspects of the disclosure, a draper belt design includes sensors embedded within the draper belt itself. The sensors sufficiently communicate with a belt protection controller, or any other suitable device, to relay useful information regarding key measurable properties, such as, but not limited to belt speed, belt temperature, belt stress, belt alignment, and the like, or other information such the belt's manufacturing date code or serial information. The useful information may be relayed to and received by an operator, a control system(s), management, or any suitable combination thereof, to then be notified about the condition of the draper belt, as well as potentially damaging condition of the draper belt. In some aspects, the information is relayed in real time so the property, or properties, of the belt is ascertainable in situ. In some other aspects, the information may be accumulated in a package, and later relayed as appropriate.

In those cases where the draper belt properties are measured and the resultant information relayed in real time, the recipient of the information may be enabled to modify the operating scenario to avoid or otherwise correct for potential draper belt mistracking. Where the draper belt is actually mistracked, the system provides an immediate emergency notification to the recipient to then, in turn, stop and correct the mistracked draper belt situation.

In some embodiments, the resultant information transferred is used to proactively adjust the equipment to improve the performance of the belt, or even in some cases to avoid a catastrophic event.

In some aspects, the sensors provide details to a control unit, and software integrated therewith is used to provide the draper belt condition to a general user interface or monitor, based upon the information received. The general user interface or monitor may be viewed, in some cases, by a crop harvesting equipment operator, and appropriate action may be taken by the operator to avoid damaging the draper belt.

Now referring to FIGS. 1 through 5, a crop harvesting header H is depicted and includes a header frame F, with draper arm assemblies DA and end tilt arm assemblies E pivotally secured to the frame F. The assemblies DA and E support cutterbar assembly C. The cutterbar assembly C includes a flexible cutterbar B and skids S carried on the forward ends of the assemblies DA and E. The header H also broadly includes a draper assembly A with side draper belts SD and center draper belt CD. The header H includes a lower belt support assembly L. Additional details of some of the other components of the header are disclosed in U.S. Pat. No. 7,836,671, issued Nov. 23, 2010, entitled FLEXIBLE DRAPER AND CUTTER BAR WITH TILT ARM FOR CUTTERBAR DRIVE, which is hereby incorporated in its entirety by reference herein.

Figure 6:
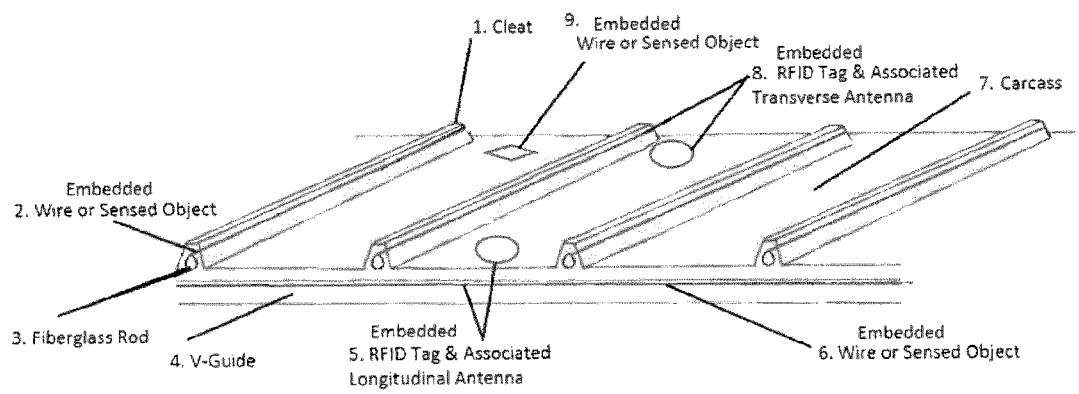

FIG. 6 depicts a portion of draper belt embodiment, such as those which could be used in crop harvesting header H as side draper belts SD and center draper belt CD in a perspective sectional view, in accordance with some embodiments of the disclosure. As described above, the draper belt generally includes one or more sensors embedded within the draper belt itself, which sufficiently relay useful information regarding key measurable properties, such as, but not limited to belt speed, belt temperature, belt stress, belt alignment, and the like, or other information about the belt. In an aspect of the disclosure, draper belt cleat 1 may include an embedded wire or sensed object 2 as a sensor, and such sensor may be disposed adjacent or proximate fiberglass rod 3.

In some other aspects, draper belt carcass 7 includes an embedded radio frequency identification tag (RFID tag) 8 and associated transverse antenna disposed within a cleat located proximate the embedded RFID tag. The draper belt carcass 7 may further include an embedded RFID tag 5 and associated longitudinal antenna disposed within V-guide 4.

In yet other aspects, the draper belt may include an embedded wire or sensed object 6 as a sensor, and such sensor may be disposed within V-guide 4. In some cases, draper belt includes embedded wire or sensed object 9 within the carcass 7.

Use of any single sensor arrangement or suitable combination of sensor arrangements described is within the scope and spirit of the disclosure. Further, the embedded sensor objects may be conductive elements, magnetic elements, optically reactive elements, an electronic tag that exchanges data with a RFID reader through radio waves, and the like. The materials forming the sensor objects may be metallic, nonmetallic, or combinations thereof.

In addition to the draper belt types described above, uses of the inventive concepts in other belts, such as hay merger belts and conveyor belts, and the like, are included within the scope of the disclosure.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described.

The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A draper belt comprising a carcass, a plurality of cleats extending from the carcass, and a plurality of v-guides disposed perpendicular to the plurality of cleats;
    wherein the draper belt further comprises at least one sensor for measuring and relaying information regarding key measureable properties about the draper belt;
    wherein the at least one sensor measures and relays information in real time so one or more properties of the draper belt is ascertainable in situ; and,
    wherein the at least one sensor is an embedded radio frequency identification tag (RFID tag) disposed within the carcass and an associated transverse antenna disposed within a cleat located proximate the embedded RFID tag.

2. The draper belt according to claim 1, wherein the key measureable properties are relayed to an operator, a control system, or combination thereof.

3. The draper belt according to claim 1, wherein the at least one sensor measures and relays potentially damaging condition(s) of the draper belt.

4. The draper belt according to claim 1, wherein a recipient of the information may be enabled to modify the operating scenario to avoid or otherwise correct for potential draper belt mistracking.

5. The draper belt according to claim 1, wherein the at least one sensor measures belt speed, belt temperature, belt stress, belt alignment, manufacturing date code, serial information, or any combination thereof.

6. The draper belt according to claim 1, wherein the at least one sensor is a sensed object disposed within the carcass.

* * * * *